(12) United States Patent
Kondou et al.

(10) Patent No.: US 7,831,122 B2
(45) Date of Patent: Nov. 9, 2010

(54) OPTICAL CONTROL DEVICE AND MANUFACTURING METHOD THEREOF

(75) Inventors: Katsutoshi Kondou, Chiyoda-ku (JP);
Yuhki Kinpara, Chiyoda-ku (JP);
Futoshi Yamamoto, Chiyoda-ku (JP);
Junichiro Ichikawa, Chiyoda-ku (JP)

(73) Assignee: Sumitomo Osaka Cement Co., Ltd., Tokyo (JP)

( * ) Notice: Subject to any disclaimer, the term of this patent is extended or adjusted under 35 U.S.C. 154(b) by 0 days.

(21) Appl. No.: 12/225,781

(22) PCT Filed: Mar. 5, 2007

(86) PCT No.: PCT/JP2007/054221
§ 371 (c)(1),
(2), (4) Date: Dec. 16, 2008

(87) PCT Pub. No.: WO2007/111083
PCT Pub. Date: Oct. 4, 2007

(65) Prior Publication Data
US 2009/0116802 A1 May 7, 2009

(30) Foreign Application Priority Data
Mar. 29, 2006 (JP) .............................. 2006-092292

(51) Int. Cl.
*G02B 6/10* (2006.01)
(52) U.S. Cl. .............................. 385/129; 385/28; 385/43
(58) Field of Classification Search .................. None
See application file for complete search history.

(56) References Cited

U.S. PATENT DOCUMENTS 4,999,686 A  3/1991  Autier et al.
5,585,957 A * 12/1996  Nakao et al. ................. 359/248
5,799,119 A  8/1998  Rolland et al.

(Continued)

FOREIGN PATENT DOCUMENTS

JP          2-110405          4/1990

(Continued)

OTHER PUBLICATIONS

Wenger, G., et al., Design and Fabrication of Monolithic Optical Spot Size Transformers (MOST's) for Highly Efficient Fiber-Chip Coupling, Journal of Lightwave Technology, vol. 12, No. 10, Oct. 1994, pp. 1782-1790.

(Continued)

*Primary Examiner*—Mike Stahl
(74) *Attorney, Agent, or Firm*—Chapman and Cutler LLP

(57) ABSTRACT

The purpose of present inventions is to provide an optical control device having a single-mode waveguide in the optical control device having the ridge waveguide, and to stably manufacture and provide the optical control device having the single-mode waveguide with high precision even when the substrate is a thin plate with the thickness of 10 μm or less. An optical control device having a substrate 1 formed with an optical waveguide, in which the substrate is a thin plate with a thickness of 10 μm or less, at least a portion of the optical waveguide is configured as a ridge waveguide 21, a trench 20 having a width of 10 μm or less is formed on both sides of at least portions of the ridge waveguide, and a taper waveguide section (area B) continuously changes a light propagation mode of the waveguide between a single-mode and a multi-mode by continuously changing the width or depth of the trench. Additionally, it is desirable that the taper waveguide section is disposed at least in one of a light input section and a light output section, and light propagating through the waveguide is in the single-mode in a section in which the taper waveguide section is disposed.

9 Claims, 4 Drawing Sheets

U.S. PATENT DOCUMENTS

| | | | |
|---|---|---|---|
| 6,465,269 B2 * | 10/2002 | Furushima | 438/31 |
| 6,853,793 B1 * | 2/2005 | van der Vliet et al. | 385/130 |
| 2006/0109542 A1 | 5/2006 | Mizuuchi et al. | |

FOREIGN PATENT DOCUMENTS

| | | |
|---|---|---|
| JP | 10-073792 | 3/1998 |
| JP | 2002-341393 | 11/2002 |
| JP | 2004-219751 | 8/2004 |

OTHER PUBLICATIONS

International Search Report, International Application No. PCT/JP2007/054221, Apr. 3, 2007.

* cited by examiner (a)

(b)

OPTICAL CONTROL DEVICE AND MANUFACTURING METHOD THEREOF

TECHNICAL FIELD

The present invention relates to an optical control device and a manufacturing method thereof, and more particularly to the optical control device having a ridge waveguide and the manufacturing method thereof.

BACKGROUND ART

In the prior art, various types of optical control devices such as an optical modulator, an optical switch, a polarization device, and the like have been practically used. Examples of an optical waveguide formed in the optical control device include a ridge waveguide in which convex-shaped ridges are formed on a surface of a substrate, and a waveguide in which impurities such as Ti are diffused by heat.

Recently, in order to lower a drive voltage or improve high frequency response characteristics of the optical control device, a substrate constituting the optical control device has been formed into a thin plate, or an optical circuit in the optical control device has decreased in size.

The decrease in size of the optical circuit results in a decrease in cross-sectional area of the optical waveguide constituting the optical circuit. Accordingly, the following problems arise.

(1) An acceptable value in manufacturing the optical waveguide structure becomes small, thereby configuring the waveguide as the multi-mode waveguide.

(2) A coupling loss between the known single-mode optical fiber and the optical control device (optical circuit) increases due to the (1), thereby degrading a reproducibility of an optical signal.

FIG. 1 is a schematic sectional view of the optical control device in which a convex-shaped ridge is formed on a substrate and concave sections (hereinafter, referred to as "trench") are formed on both sides of the ridge to form a ridge waveguide. A reinforcing plate 3 is adhered to a substrate 1 with an adhesion layer 2 interposed therebetween. A reference numeral 4 denotes the ridge optical waveguide.

The propagation mode of the optical waveguide is changed in accordance with the shape of the ridge waveguide shown in FIG. 1. Specifically, as shown in FIG. 2, the propagation mode of the optical waveguide is divided into single-mode and multi-mode areas depending on the condition of a width W and a depth D of an optical waveguide 4 and a thickness H of the substrate.

Additionally, FIG. 2 shows a graph modeling the ridge waveguide without the trench. Suppose that a tilt angle $\theta$ of the side surface of the waveguide 4 is 70°, a propagating light wave is 1.55 $\mu$m in a wavelength $\lambda$ and is in a TM mode, a refractive index of the substrate is 2.1, the refractive index of an upper surface of the substrate is 1.0 like air, and the refractive index of a lower surface is 1.45 like $SiO_2$.

As shown in FIG. 2, as the height H of the substrate becomes thin, the value of a horizontal axis (r=(H−D)/H) decrease and the value of a vertical axis (W/H) increase. Accordingly, an overall change in the propagation mode from the single-mode to the multi-mode can be easily understood.

Meanwhile, as disclosed in Patent Document 1, an acceptable value of the single-mode waveguide can be increased by forming a slab waveguides beside the optical waveguide. However, the multi-mode of the propagation mode occurring at the time when the optical circuit decreases in size as shown in FIG. 2 also occurs in the optical control device having the ridge waveguide with the trench. When the substrate is formed into a thin plate, particularly 10 $\mu$m or less, it is necessary to configure the trench to have a width (symbol "T" in FIG. 1) equal to or less than of 1 $\mu$m in order to realize the single mode propagation.

[Patent Document 1] JP-A-2004-219751

Additionally, as for the ridge waveguide using the thin plate, a difference $\Delta n$ in the refractive index between the substrate and air or between the substrate and the adhesion layer (buffer layer) is large. Accordingly, in order to maintain in the single-mode, the cross-sectional area of the optical waveguide itself is required to become small. When the cross-sectional area of the waveguide becomes small, a manufacturing error involved in the width of the optical waveguide and the depth of the trench which can be ignored in the prior art cannot be ignored any more. When the optical waveguide is to be operated in the multi-mode, an S/N ratio or an optical insertion loss is degraded. Further, when the ridge waveguide has a Y branch area and the reproduction of the shape is unsatisfactory, the S/N ratio or the optical insertion loss is degraded as well. Even when the conditions of the single mode in the light input and output sections of the optical waveguide are satisfied, a little different shape results in a considerable change in the optical insertion loss.

Meanwhile, when the ridge waveguide is manufactured, a mask corresponding to a pattern of the optical waveguide is placed on a substrate having an electro-optic effect, and then a portion of the substrate is removed by performing the wet etching process, the dry etching process, or the like, or a groove or the like is formed by performing a machining process such as the dicing saw process and the like. However, when the trench of the ridge waveguide is formed by the known wet or dry etching process, a lower portion of a mask 10 disposed on a substrate 1 becomes an undercut 11 shown in FIG. 3A or becomes a locally unusual shape 12 shown in FIG. 3B. The optical waveguide with such shapes is configured as a leaky mode (a mode in which light does not propagate and since there are uneven portions in the waveguide shape, the mode refers to a state light does not diffuse) or the multi-mode waveguide. Accordingly, it is difficult to manufacture the single-mode waveguide. Further, in the machining process, the limitation of the groove width is 2 $\mu$m or so, and particularly when the machining process is performed in order to manufacture the thin plate with the thickness of 10 $\mu$m or less, the substrate may be damaged.

Accordingly, in order to prevent the S/N ratio or the optical insertion loss from being degraded in the optical control device using the thin plate, a high process precision of 0.1 $\mu$m or less is required when the trench of the ridge waveguide is processed. However, it is difficult to obtain the satisfactory precision by means of the known etching or machining process.

DISCLOSURE OF THE INVENTION

Problems to be Solved by the Invention

The invention has been made to solve the above-described problems, and it is an object of the invention to provide an optical control device having a single-mode waveguide in the optical control device having the ridge waveguide, and particularly to stably manufacture and provide the optical control device having the single-mode waveguide with high precision even when the substrate is a thin plate with the thickness of 10 µm or less.

Means for Solving the Problems

According to a first aspect of the invention, an optical control device has a substrate formed with an optical waveguide, in which the substrate is a thin plate with a thickness of 10 µm or less, at least a portion of the optical waveguide is configured as a ridge waveguide, a trench having a width of 10 µm or less is formed on both sides of at least portions of the ridge waveguide, and a taper waveguide section continuously changes a light propagation mode of the waveguide between a single-mode and a multi-mode by continuously changing the width or depth of the trench.

Additionally, "the taper waveguide" contains a portion in which the width of the ridge continuously increases or decreases by continuously increasing or decreasing the width of the trench constituting the ridge waveguide or a portion in which the depth of the trench continuously becomes deep or shallow even when the width of the ridge does not change.

According to a second aspect of the invention, in the optical control device according to the first aspect of the invention, the taper waveguide section is disposed at least in one of a light input section and a light output section and light propagating through the waveguide is in the single-mode in a section in which the taper waveguide section is disposed.

According to a third aspect of the invention, in the optical control device according to the first or second aspect of the invention, the taper waveguide section has an approximately symmetrical shape with respect to a vertical section passing through the center line of the optical waveguide.

"The approximately symmetrical shape" according to the aspect of the invention refers to a symmetrical shape in which a single-mode light wave propagating thought the taper waveguide is not changed into high-order mode light or a coupling loss of the symmetrical-shaped optical device does not increase.

According to a fourth aspect of the invention, in the optical control device according to the first and second aspect of the invention, the taper waveguide section has an approximately asymmetrical shape with respect to a vertical section passing through the center line of the optical waveguide.

According to a fifth aspect of the invention, in the optical control device according to any one of the first to fifth aspects of the invention, the substrate has a nonlinear optical effect, an electro-optic effect, a pyroelectric effect, or a piezoelectric effect.

According to a sixth aspect of the invention, in the optical control device according to the fifth aspect of the invention, the substrate is made of $LiNbO_3$, $LiTaO_3$, or $KTiOPO_4$.

According to a seventh aspect of the invention, in the optical control device according to any one of the first to sixth aspects of the invention, at least a portion of the ridge waveguide is formed by using a focused ion beam or laser beam process.

According to an eighth aspect of the invention, in the optical control device according to any one of the first to sixth aspects of the invention, the ridge waveguide is formed by performing an etching or machining process as a first-order process and then performing a focused ion beam or laser beam process as a finishing process.

According to a ninth aspect of the invention, a method of manufacturing the optical control device according to the eighth aspect of the invention includes the steps of introducing light to the optical control device, and performing the finishing process while measuring the introduced light.

Effects of the Invention

According to the first aspect of the invention, it is possible to provide an optical control device having a substrate formed with an optical waveguide, in which the substrate is a thin plate with a thickness of 10 µm or less, at least a portion of the optical waveguide is configured as a ridge waveguide, a trench having a width of 10 µm or less is formed on both sides of at least portions of the ridge waveguide, and a taper waveguide section continuously changes a light propagation mode of the waveguide between a single-mode and a multi-mode by continuously changing the width or depth of the trench. Accordingly, even when the propagation mode becomes the multi-mode in the optical control device, the single-mode light only can be selected, thereby preventing an S/N ratio or optical insertion loss from being degraded and the like.

According to the second aspect of the invention, since the taper waveguide section is disposed at least in one of a light input section and a light output section and light propagating through the waveguide is in the single-mode in a section in which the taper waveguide section is disposed, a coupling loss of an optical fiber optically coupling with the optical waveguide can reduce.

Moreover, since the single-mode light wave only propagates in the optical waveguide in spite of the multi-mode waveguide in the interior optical waveguide (section other than the light input section and light output section), it is possible to provide the optical control device in which the S/N ratio or optical insertion loss is prevented from being degraded.

According to the third aspect of the invention, since the taper waveguide section has an approximately symmetrical shape with respect to a vertical section passing through the center line of the optical waveguide, it is possible to increase a coupling efficiency at the time when an optical device with a symmetrical shape such as the optical fiber, a lens, or the like is coupled with an optical control device.

According to the fourth aspect of the invention, since the taper waveguide section has an approximately asymmetrical shape with respect to a vertical section passing through the center line of the optical waveguide, it is possible to excite a specific high-order mode. Accordingly, it is possible to form a waveguide with high conversion efficiency in a modal dispersion-phase matching wavelength conversion element. For example, in a parametric down-conversion, it is possible to excite a high-mode of a fundamental wave and improve an overlap of down-convert light and a fundamental mode to increase the conversion efficiency. In this manner, it is possible to provide second-order nonlinear optical control devices such as an optical second-order harmonic generation device, a sum (difference) frequency generating device, an optical parametric amplifier oscillator, and the like.

According to the fifth aspect of the invention, it is possible to provide various uses of the optical control devices such as wavelength conversion device, an EO device, an electrical field sensor since the substrate has a nonlinear optical effect, an electro-optic effect, a pyroelectric effect, or a piezoelectric effect.

According to the sixth aspect of the invention, it is possible to provide various optical control devices with an excellent optical waveguide characteristic or an excellent modulation characteristic by an electrical field since the substrate is made of $LiNbO_3$, $LiTaO_3$, or $KTiOPO_4$.

According to the seventh aspect of the invention, it is possible to form a groove of a rib waveguide with precision of sub-micro order since at least a portion of the ridge waveguide is formed by using a focused ion beam or laser beam process. In this manner, it is possible to stably manufacture the optical control device having the single-mode waveguide in the optical control device using the thin plate with high precision.

According to the eighth aspect of the invention, since the ridge waveguide is formed by performing an etching or machining process as a first-order process and then performing a focused ion beam (FIB) or laser beam (LB) process as a finishing process, it is possible to lower the manufacturing cost and to shorten the manufacturing time rather than a method of manufacturing all grooves and the like necessary for the optical control device using the FIB or LB process.

According to the ninth aspect of the invention, since a method of manufacturing the optical control device includes the steps of introducing light to the optical control device and performing the finishing process while measuring the introduced light at the time performing the finishing process using the FIB or LB process, the ridge waveguide in accordance with a characteristic required for each optical control device is formed, and thus it is possible to provide an excellent optical control device. In particular, by adjusting an output of the FIB or LB process, it is possible to perform the process suitable to the measurement time. Additionally, since the process precision is the sub-micro precision, it is possible to finish the ridge waveguide a desired depth or width of the trench, a desired tilt angle of a side surface of the ridge, and the like

REFERENCE NUMERALS

1: SUBSTRATE
2: ADHESION LAYER
3: REINFORCING PLATE
4, 21, 31, 41: WAVEGUIDE
5, 20, 30, 32, 40, 42: GROOVE
6: SLAB WAVEGUIDE
10: MASK
11: UNDERCUT
12: LOCALLY UNUSUAL SHAPE

BEST MODE FOR CARRYING OUT THE INVENTION

Hereinafter, the invention will be described with reference to preferred embodiments.

An optical control device related to the invention has a substrate formed with an optical waveguide, in which the substrate is a thin plate with a thickness of 10 μm or less, at least a portion of the optical waveguide is configured as a ridge waveguide, a trench having a width of 10 μm or less is formed on both sides of at least portions of the ridge waveguide, and a taper waveguide section continuously changes a light propagation mode of the waveguide between a single-mode and a multi-mode by continuously changing the width or depth of the trench.

Figure 4:
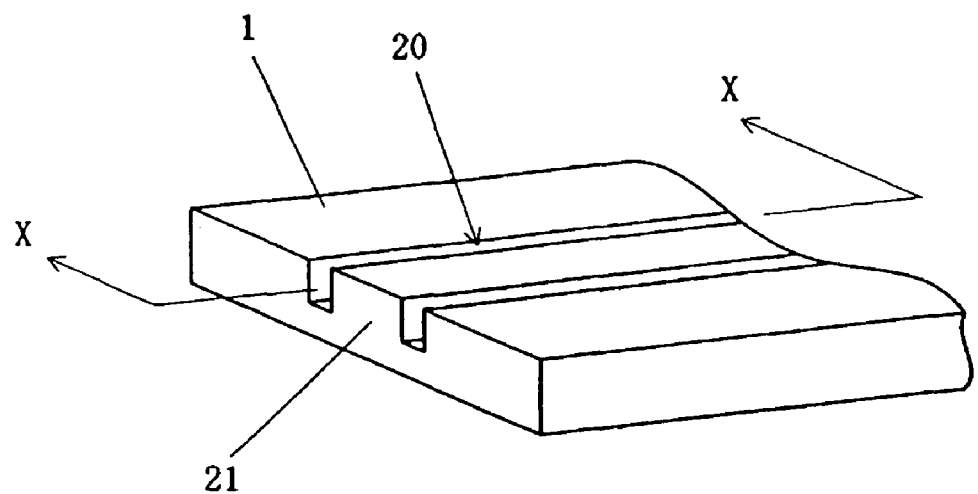
FIGS. 4A and 4B are diagrams illustrating an embodiment of the optical control device related to the invention.
Figure 4:
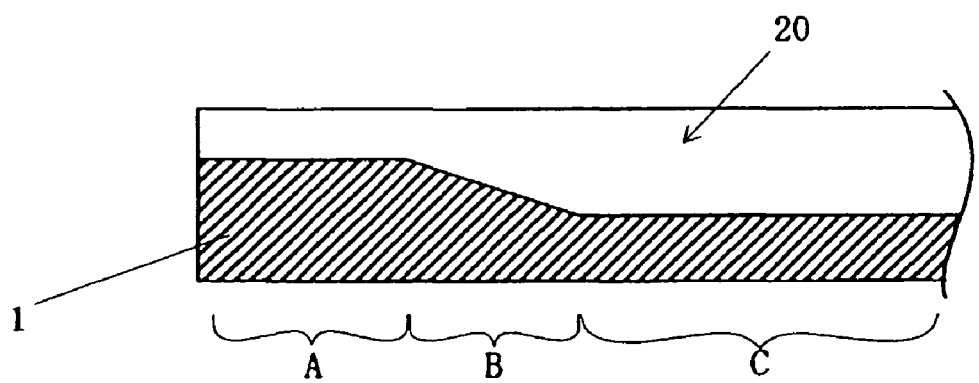

FIGS. 4A and 4B illustrate an embodiment of the optical control device related to the invention, and the ridge waveguide is formed on a substrate 1. A rib waveguide is formed by two grooves (trench) 20.

FIG. 4B is a sectional view of FIG. 4A taken along an arrow X-X and a depth of the groove in an edge section (area A) of the substrate 1 is different from that in an interior section (area C) thereof.

Figure 1:
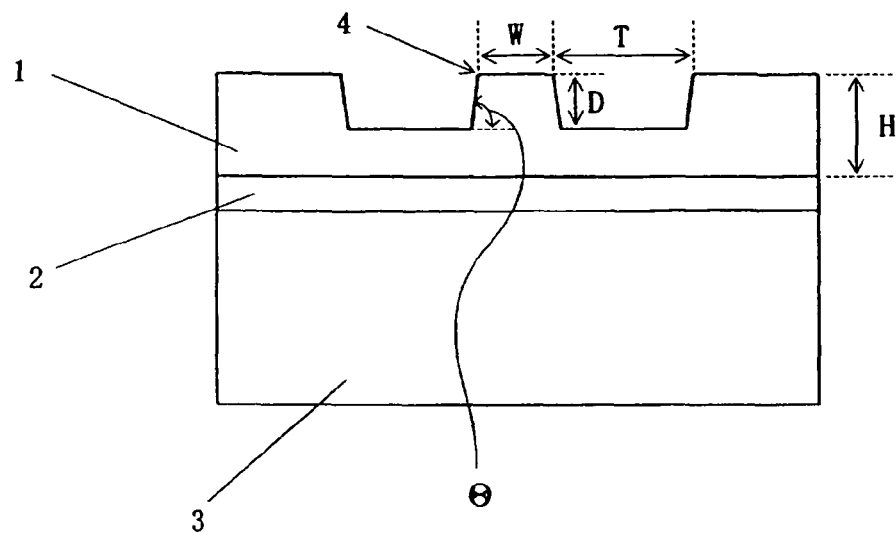
FIG. 1 is a sectional view showing an optical control device with a ridge waveguide.
Figure 2:
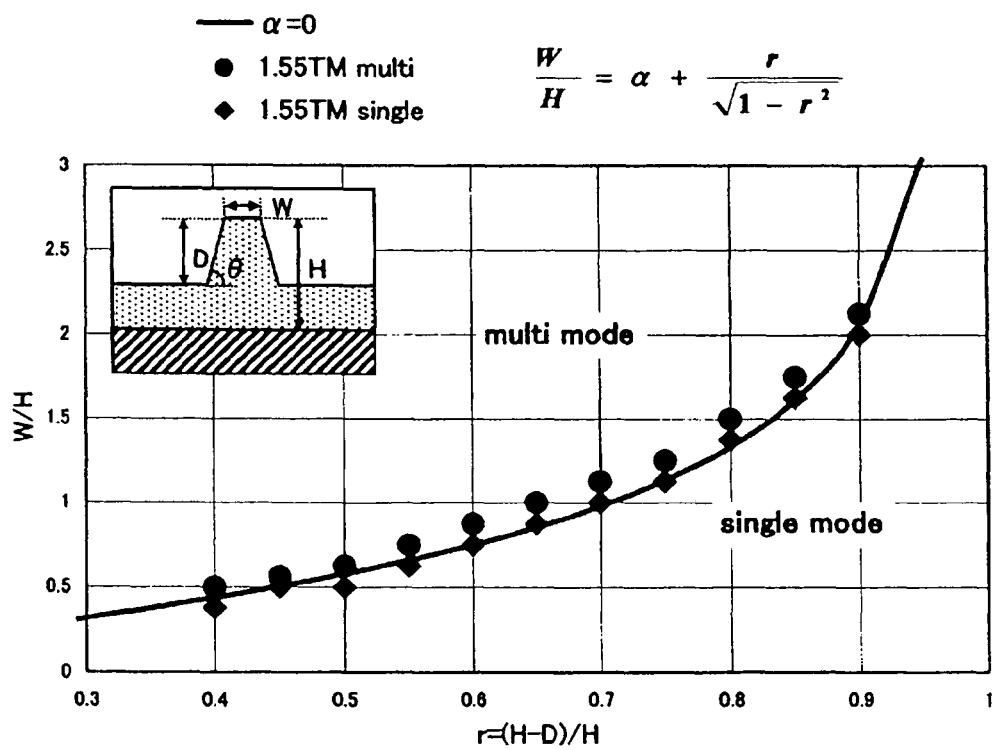
FIG. 2 is a graph showing a relationship between the shape of a ridge waveguide and a propagation mode.
Figure 3:
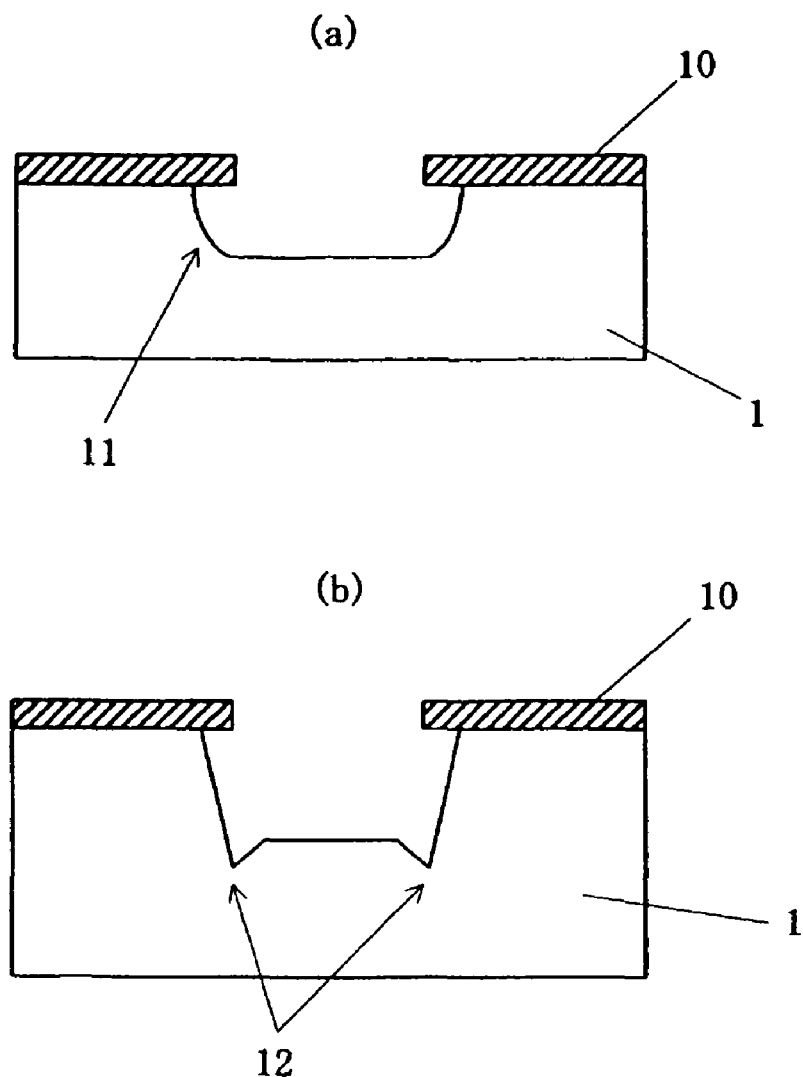
FIGS. 3A and 3B show sections of a substrate when grooves are formed by performing the known etching process.

A propagation mode is configured as a single-mode in the area A in which the groove is shallow, whereas the propagation mode is configured as a multi-mode in the area C in which the groove is deep. As shown in FIG. 2, the propagation mode can be easily changed by adjusting the shape of the ridge waveguide. Accordingly, a change in a required waveguide shape can be easily made in accordance with a use of the optical control device using a focused ion beam (FIB) or a laser beam (LB).

For example, when FIGS. 4A and 4B illustrate a light input section of light propagating to the optical control device or a light output section of light propagating from the optical control device, an optical fiber coupled with the optical control device can use an optical device of the single-mode, thereby suppressing degradation of an optical insertion loss. Additionally, the area C becomes the multi-mode and light is shut satisfactorily. Accordingly, since a modulation process is performed with respect to the single-mode light passing the single-mode waveguide of the area A, a degradation of an S/N ratio can be suppressed. Accordingly, it is possible to provide the optical control device having a good modulation efficiency and reproducibility of a signal.

Further, by forming the single-mode waveguide in the light input section or light output section of the optical control device, the known automatic center-adjusting apparatus can be used when the optical control device is coupled with the optical fiber. In this manner, an excellent effect can be obtained.

An area B denotes a portion in which "a taper waveguide" is formed and the thicknesses of the grooves are continuously changed between the areas A and B. As a result, a change from the multi-mode waveguide to the single-mode waveguide or vice versa can be smoothly made, thereby extremely suppressing a propagation loss of light.

When the taper waveguide has an approximate symmetrical shape with respect to a vertical section passing the center line of the optical waveguide, it is possible to excite a specific high-order mode light wave, thereby suppressing the multi-mode light. As a result, it is possible that the single-mode light wave can be stably propagated.

In contrast, by changing thicknesses of two trenches in the taper waveguide so that the thickness are made different each other to configure the taper waveguide with asymmetrical shape with respect to the vertical section passing the center line of the optical waveguide, it is possible to excite a specific high-order mode and to form a waveguide with a high conversion efficiency in a modal dispersion-phase matching wavelength conversion element.

It is desirable that a substrate used in the optical control device has a nonlinear optical effect, an electro-optic effect, or a piezoelectric effect. By using these effects, it is possible to provide the optical control devices for various uses such as a wavelength conversion device, an EO device, an electrical field sensor, and the like Additionally, by using $LiNbO_3$, $LiTaO_3$, or $KTiOPO_4$ as a material of the substrate, it is possible to provide various optical control devices with an excellent optical waveguide characteristic or an excellent modulation characteristic by an electrical field.

However, in order to form the single-mode ridge waveguide described above using the substrate with the thickness of 10 μm or less, it is necessary to use a process method with a process precision of a sub-micro order. Accordingly, at least a focused ion beam (FIB) or a laser beam is used to process at least a portion of the ridge waveguide according to the invention.

The FIB process is a process of processing a surface of an object by irradiating the focused gallium ion beam to the object and sputtering an atom or molecule on the surface of the object. Since a scanning ion microscopy (SIM) is added to an FIB process device on the market and thus areas to be processed can be determined with reference to an image of SIM, it is possible to process the object surface with a high precision.

Additionally, when the laser beam (LB) is used, the sub-micro order process can be performed as well. The FIB or LB process can be used depending on a kind of substrate or a shape to be processed. Both of the FIB and LB processes can be used together.

By using both the FIB and LB processes, grooves can be formed in the optical control device, but when there are many formed grooves, it takes much to manufacture the grooves, and thus a manufacturing cost increases. Accordingly, a wet etching, a dry etching, a dicing saw process, or the like can be performed in an area in which the multi-mode is permissible before the process can be performed using the FIB or LB process in order to decrease the manufacturing time and cost.

Additionally, the FIB or LB process is not only used to form grooves, but can be applied to various uses such as an adjustment of an angle of a side surface of the ridge waveguide or a trimness of a substrate surface (locally unusual shape and the like) which is processed first using an etching, a dicing saw process, or the like. In this manner, a rough portion of a side surface of a ridge or an interior surface of the groove is decreased, thereby preventing scattering of the light wave and the like, thereby realizing the optical control device while maintaining a low light propagation loss.

In particular, when the second-order process is performed using the FIB or LB process, it is possible to perform the second-order process by inputting light to the optical waveguide using the optical waveguide of the optical control device formed by the first-order process and then measuring the light wave exiting from the optical control device on a monitor. In this manner, it is possible to manufacture the optical control device with more optimized characteristic. Moreover, when the second-order process is performed in a state where an optical circuit mounted in the optical control device is operated, if necessary, it is possible to realize an operating environment that is suitable to the optical control device. Additionally, the wavelength of LB used at the second-order process can be made different from that of the light wave entering the optical control device. Even when LB for a process is entered into a monitor light, it is possible to easily separate the wavelengths to measure them, thereby maintaining higher process precision.

Figure 5:
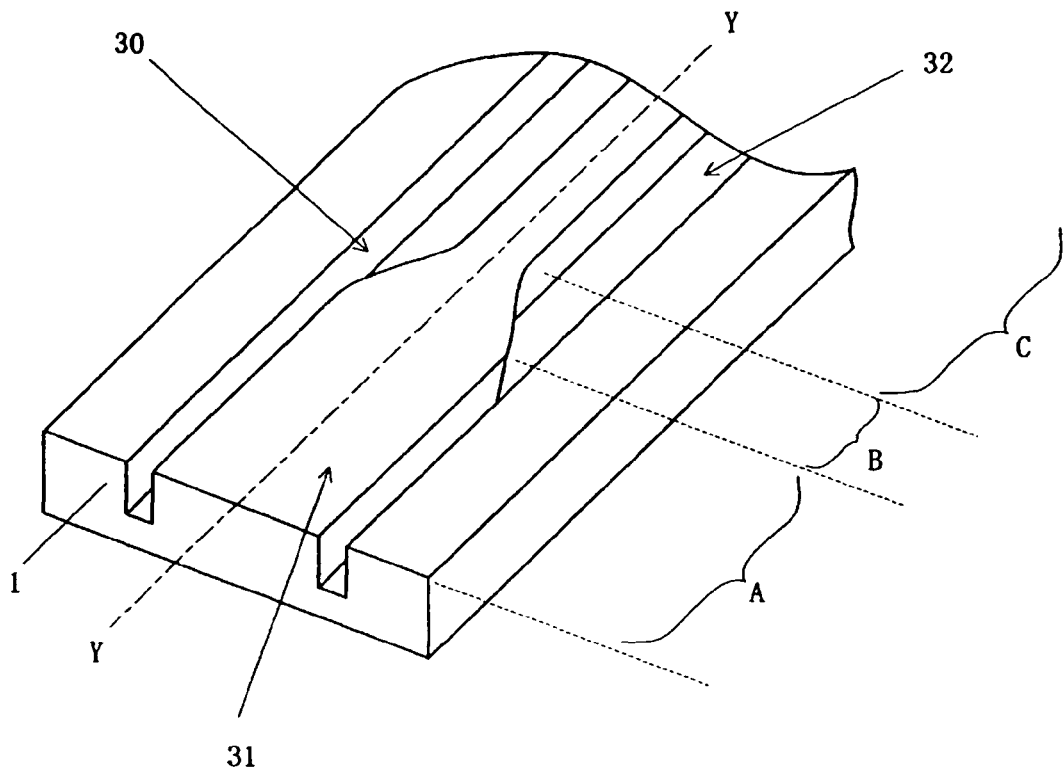
FIG. 5 is a diagram illustrating another embodiment (taper waveguide with a symmetrical shape) of the optical control device related to the invention.

Next, FIG. 5 shows a portion of the optical control device according to another embodiment related to the invention, and a ridge waveguide is formed on the substrate 1 with the electro-optic effect. Two grooves 30 constitute the ridge waveguide.

Since the width of an edge portion of the substrate 1 (area A) is different from that of the interior portion thereof (area B) in FIG. 5, the width of the ridge portion varies finally.

When the substrate 1 is a thin plate with a thickness of 10 μm or less, the width of a groove 30 or 32 is required to be 1 μm or less in order to form the optical waveguide 31 of the area A as the single-mode waveguide. Accordingly, the area A or B is processed using the FIB or LB process and an area C is processed using the known etching, dicing saw process, or the like, if necessary. Additionally, when the propagation mode is changed between the areas A and B, shapes between the areas A and B are successively changed. Accordingly, it is desirable that the widths of the groove 30 or 32 are continuously changed.

In FIG. 5, the shape of the area B configured as the taper waveguide section is approximately symmetrical with respect to a vertical section (a surface perpendicular to the substrate 1 and taken along the dashed-dotted line Y) passing through the center line of the optical waveguide. On this account, when an optical device with a symmetrical shape such as the optical fiber or a lens is coupled with an optical control device, it is possible to increase a coupling efficiency. Further, in the taper waveguide section, it is possible to suppress a generation of high-order mode light.

Figure 6:
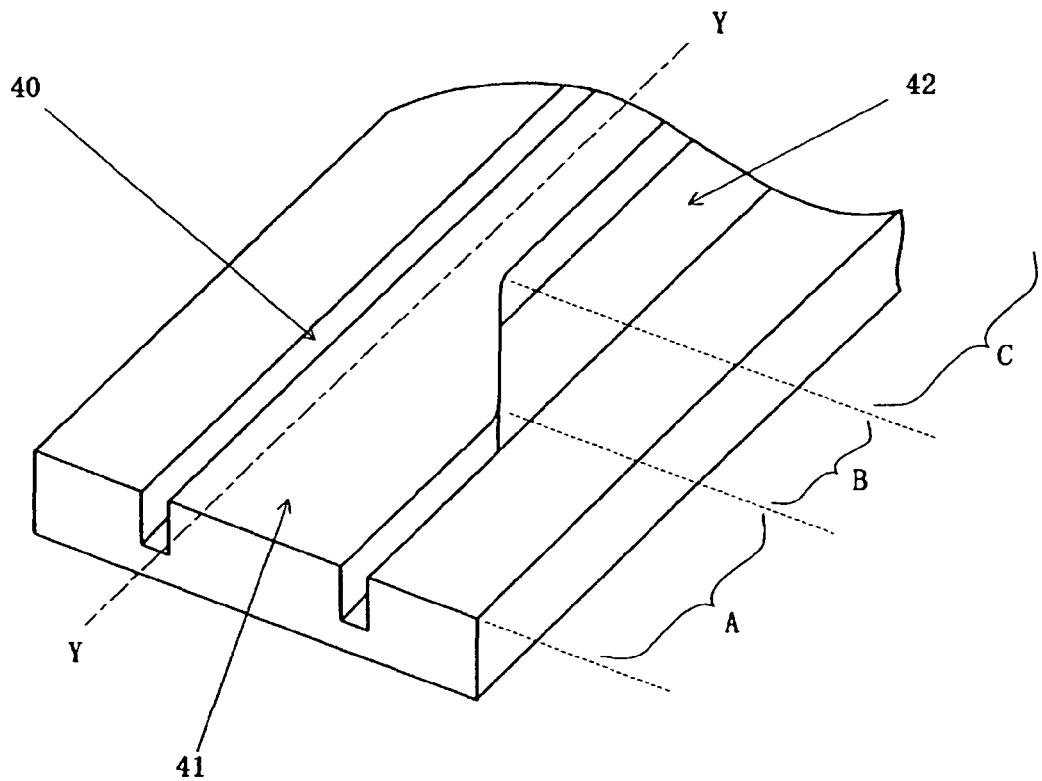
FIG. 6 is a diagram illustrating another embodiment (taper waveguide with an asymmetrical shape) of the optical control device related to the invention.

In FIG. 6, on the other hand, since the shape of the area B configured as the taper waveguide section is approximately asymmetrical with respect to a vertical section (a surface perpendicular to the substrate 1 and taken along the dashed-dotted line Y) passing through the center line of the optical waveguide, it is possible to excite multi-mode light or to form a waveguide with to form a waveguide with a high conversion efficiency in a modal dispersion-phase matching wavelength conversion element. A reference numeral 41 denotes an optical waveguide of a ridge portion, and reference numerals 40 and 42 denote the grooves.

INDUSTRIAL APPLICABILITY

As described above, it is possible to provide an optical control device having a single-mode waveguide in the optical control device having the ridge waveguide according to the invention, and particularly to stably manufacture and provide the optical control device having the single-mode waveguide with high precision even when the substrate is a thin plate with the thickness of 10 μm or less.

The invention claimed is:

1. An optical control device having a substrate formed with an optical waveguide, wherein
the substrate is a thin plate with a thickness of 10 μm or less,
a reinforcing plate is adhered to the substrate with an adhesion layer interposed therebetween,
at least a portion of the optical waveguide is configured as a ridge waveguide,
a trench having a width of 10 μm or less is formed on both sides of at least portions of the ridge waveguide, and
a taper waveguide section, which is disposed at least in one of a light input section and a light output section of the optical control device, continuously changes a light propagation mode of the waveguide between a single-mode and a multi-mode by continuously changing the width or depth of the trench.

2. The optical control device according to claim 1, wherein a light propagating through the waveguide is changed to a single-mode light in a section in which the taper waveguide section is disposed.

3. The optical control device according to claim 1, wherein the taper waveguide section has an approximately symmetrical shape with respect to a vertical section passing through the center line of the optical waveguide.

4. The optical control device according to claim 1, wherein the taper waveguide section has an approximately asymmetrical shape with respect to a vertical section passing through the center line of the optical waveguide.

5. The optical control device according to claim 1, wherein the substrate has a nonlinear optical effect, an electro-optic effect, a pyroelectric effect, or a piezoelectric effect.

6. The optical control device according to claim 5, wherein the substrate is made of $LiNbO_3$, $LiTaO_3$, or $KTiOPO_4$.

7. The optical control device according to claim 1, wherein at least a portion of the ridge waveguide is formed by using a focused ion beam or laser beam process.

8. The optical control device according to claim 1, wherein the ridge waveguide is formed by performing an etching or machining process as a first-order process and then performing a focused ion beam or laser beam process as a finishing process.

9. A method of manufacturing an optical control device having a substrate formed with an optical waveguide, wherein the substrate is a thin plate with a thickness of 10 μm or less, at least a portion of the optical waveguide is configured as a ridge waveguide, a trench having a width of 10 μm or less is formed on both sides of at least portions of the ridge waveguide, a taper waveguide section, which is disposed at least in one of a light input section and a light output section of the optical control device, continuously changes a light propagation mode of the waveguide between a single-mode and a multi-mode by continuously changing the width or depth of the trench, the method comprising the steps of:

forming the ridge waveguide by performing an etching or machining process as a first-order process and then performing a focused ion beam or laser beam as a finishing process, wherein the finishing process is performed while measuring light introduced into the optical control device.

* * * * *